United States Patent
Sharma et al.

(10) Patent No.: US 9,246,702 B1
(45) Date of Patent: Jan. 26, 2016

(54) SYSTEM AND METHOD FOR CONFIGURING SERVICE APPLIANCES AS VIRTUAL LINE CARDS IN A NETWORK ENVIRONMENT

(75) Inventors: Samar Sharma, San Jose, CA (US); Chao Feng, San Jose, CA (US); Venkataraman R. Natham, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 266 days.

(21) Appl. No.: 13/362,227

(22) Filed: Jan. 31, 2012

(51) Int. Cl.
*H04L 12/16* (2006.01)
*H04L 12/28* (2006.01)
*H04L 29/08* (2006.01)

(52) U.S. Cl.
CPC ...... *H04L 12/2896* (2013.01); *H04L 29/08846* (2013.01)

(58) Field of Classification Search
USPC ........... 370/396–397, 400–410; 709/202–203
See application file for complete search history.

(56) References Cited

U.S. PATENT DOCUMENTS

| | | | |
|---|---|---|---|
| 7,203,740 B1 * | 4/2007 | Putzolu et al. ................. | 709/220 |
| 2005/0198371 A1 * | 9/2005 | Smith et al. .................... | 709/238 |
| 2006/0077909 A1 * | 4/2006 | Saleh et al. .................... | 370/254 |
| 2007/0195794 A1 * | 8/2007 | Fujita et al. .............. | 370/395.53 |
| 2011/0225207 A1 * | 9/2011 | Subramanian et al. ..................... | H04L 45/586 707/803 |
| 2013/0107709 A1 | 5/2013 | Campbell | |
| 2013/0242999 A1 | 9/2013 | Kamble | |
| 2014/0137109 A1 | 5/2014 | Sharma | |

OTHER PUBLICATIONS

Cisco, VPN Client User Guide for Windows, Release 4.6, Aug. 2004, 148 pages.*
Cisco VN-Link: Virtualization-Aware Networking, Mar. 2009, Cisco Systems, Inc. 10 pages.*
VMware and Cisco Virtualization Solution: Scale Virtual Machine Networking, Jul. 2009, Cisco Systems, Inc., 4 pages.*
Chapter 5—Configuring Virtual LANs (VLANs), Jun. 2009, Brocade Communications Systems, Inc., 38 pages.*
Cisco Systems, Inc., "Cisco 4710 Application Control Engine Appliance Hardware Installation Guide," Nov. 2007; 66 pages.
Cisco Systems, Inc., "Cisco Application Control Engine (ACE) Troubleshooting Guide—Understanding the ACE Module Architecture and Traffic Flow," © 1992-2011, 6 pages.
Cisco Systems, Inc. "Cisco Data Center Network Architecture and Solutions Overview," © 1992-2006, 19 pages.
Cisco Systems, Inc., "Quick Start Guide, Cisco ACE 4700 Series Application Control Engine Appliance," Software Version A5(1.0), Sep. 2011, 138 pages.
Cisco Systems, Inc., "Routing and Bridging Guide, Cisco ACE Application Control Engine," Software Version A5(1.0), Sep. 2011, 248 pages.
Foundation for Intelligent Physical Agents, "FIPA Agent Message Transport Service Specification," © 1992-2006; http://www.fipa.org; 15 pages.
U.S. Appl. No. 14/492,008, filed Sep. 20, 2014, entitled "Discovery Protocol for Enabling Automatic Bootstrap and Communication with a Service Appliance Connected to a Network Switch," Inventors: Samar Sharma et al.
U.S. Appl. No. 14/490,504, filed Sep. 18, 2014, entitled "Handshake Mechanism for Offloading Service Appliacne Feature to Switch," Inventors: Samar Sharma et al.

* cited by examiner

*Primary Examiner* — Hoon J Chung
(74) *Attorney, Agent, or Firm* — Patent Capital Group

(57) ABSTRACT

An example method is provided and includes configuring a service appliance to offload network control plane and network data plane operations to a switch; establishing a communication channel between the service appliance and the switch; and communicating control messages between the service appliance and the switch over the communication channel. In more particular embodiment, the method can include communicating data messages between the service appliance and the switch over the communication channel.

20 Claims, 8 Drawing Sheets

US 9,246,702 B1

SYSTEM AND METHOD FOR CONFIGURING SERVICE APPLIANCES AS VIRTUAL LINE CARDS IN A NETWORK ENVIRONMENT

TECHNICAL FIELD

This disclosure relates in general to the field of communications and, more particularly, to a system and a method for configuring service appliances as virtual line cards in a network environment.

BACKGROUND

Data centers are increasingly used by enterprises for effective collaboration, data storage, and resource management. A typical data center network contains myriad network elements including servers, loadbalancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes configuring a service appliance to offload network control plane and network data plane operations to a switch; establishing a communication channel between the service appliance and the switch; and communicating control messages between the service appliance and the switch over the communication channel. In more particular embodiment, the method can include communicating data messages between the service appliance and the switch over the communication channel.

In other example embodiments, the method can include configuring the communication channel at the switch; configuring virtual local area networks (VLANs) over the communication channel; and attaching the service appliance as a virtual line card to the switch. Certain implementations may involve configuring a service instance, which may include specifying an interface for the communication channel; setting an Internet Protocol (IP) address and netmask at the service appliance; specifying a VLAN for the control message communication; specifying a VLAN group for the service appliance; and performing a bootstrap handshake between the service appliance and the switch.

In certain implementations, the switch could include an intelligent service card manager module (iSCM) that forms part of a Remote Integrated Service Engine (RISE) element with a corresponding intelligent service card client module (iSCC) on the service appliance. The iSCM can perform a number of functions such as a RISE message management function; a service discovery/bootstrap function; a service policy handling function; a restarting function; an event handling function; a timer event function; a packet switch stream (PSS) function; a Standard Code for Information Interchange (ASCII) generation function; a logging function; and a debugging function. The iSCC can communicate with an application control plane in the service appliance over a user datagram protocol (UDP) socket.

In yet other example implementations, the method can include configuring a new route at the switch for a newly created virtual line card, where the route is provided to a routing engine process and propagated to other switches in a network.

EXAMPLE EMBODIMENTS

Figure 1A:
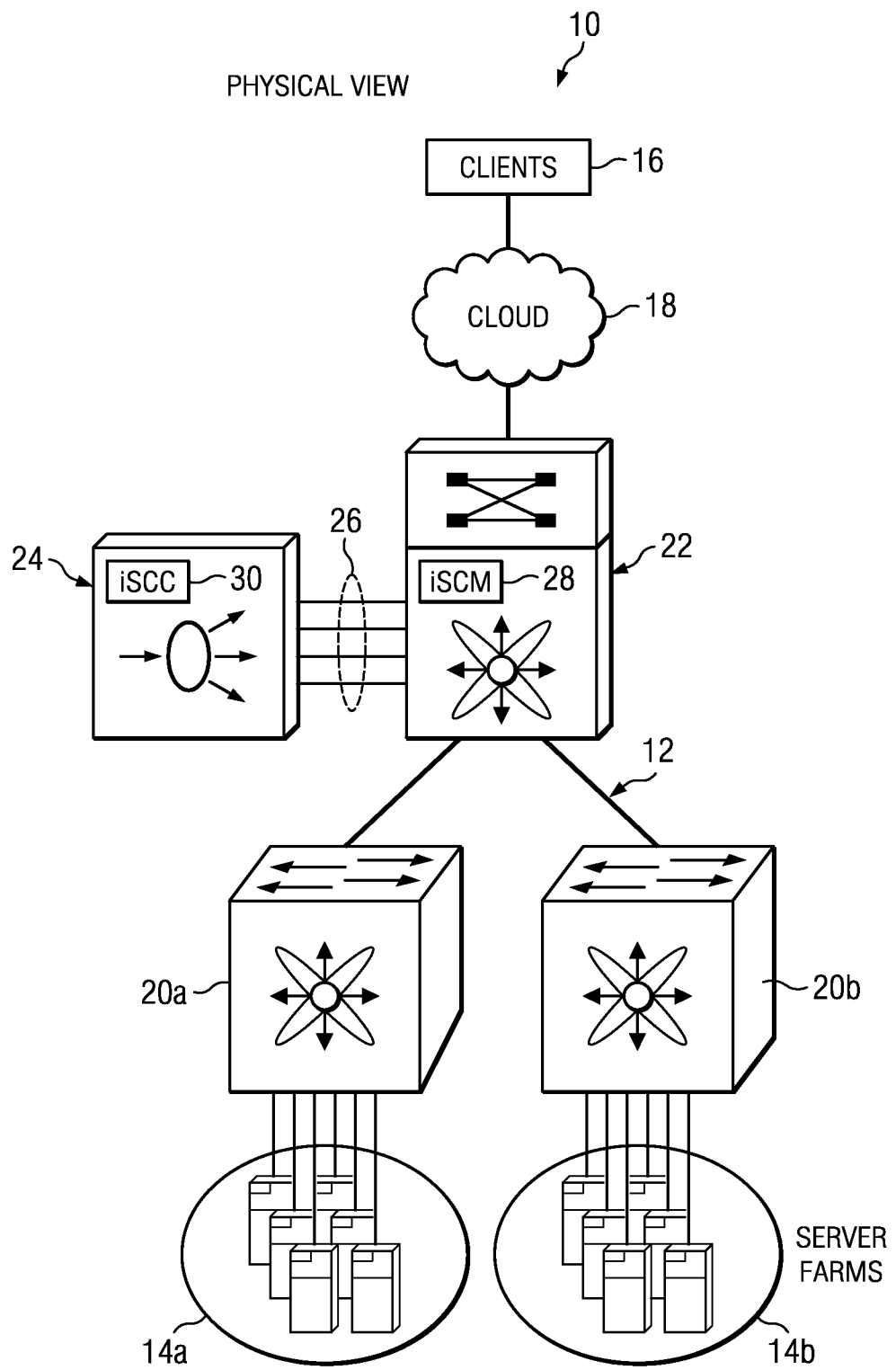
FIG. 1A is a simplified schematic diagram illustrating a physical view of a system for configuring service appliances as virtual line cards in a network environment in accordance with one embodiment.

Turning to FIG. 1A, FIG. 1A is a simplified schematic diagram illustrating a physical view of a system 10 for configuring service appliances as virtual line cards in a network environment. FIG. 1 includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within the same farm via switches 20a and 20b, respectively. Servers in server farm 14a may communicate with servers in server farm 14b via a switch 22 in this particular example implementation.

A service appliance 24 may connect to switch 22 over a communication channel 26 (e.g., over a port-channel). As used herein, a "communication channel" encompasses a physical transmission medium (e.g., a wire), or a logical connection (e.g., a radio channel) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and generally separate) hardware device with integrated software (e.g., firmware), designed to provide one or more network services including loadbalancing, firewall, intrusion prevention, virtual private network (VPN), proxy, etc. According to embodiments of the present disclosure, switch 22 may be configured with an intelligent service card manager module (iSCM) 28, and service appliance 24 may be configured with a corresponding intelligent service card client module (iSCC) 30. iSCM 28 and iSCC 30 can form part of a Remote Integrated Service Engine (RISE) infrastructure for configuring service appliance 24 as a virtual line card in switch 22.

Figure 1B:
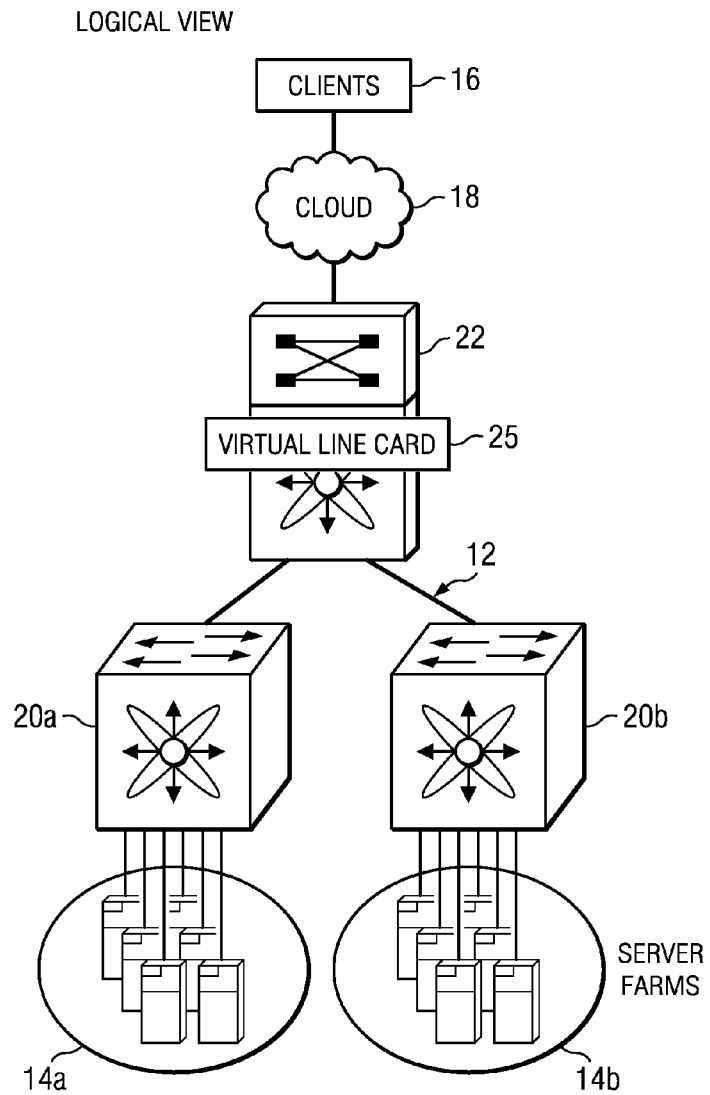
FIG. 1B is a simplified schematic diagram illustrating a logical view of the system in accordance with the embodiment.

Turning to FIG. 1B, FIG. 1B is a simplified schematic diagram illustrating a logical view of system 10. According to the embodiment disclosed in FIG. 1B, iSCC 30 and iSCM 28 may be configured to allow service appliance 24 to appear as a virtual line card 25. The terms "line card" and "service module" are interchangeably used herein to refer to modular electronic circuits interfacing with telecommunication lines (such as copper wires or optical fibers) and that offer a pathway to the rest of a telecommunications network. Hence, virtual line card 25 is interchangeable (in certain instances) with iSCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

According to embodiments of the present disclosure, an appliance user can enjoy the same benefit of a service module's simple configuration and operation using the infrastructure of system 10. For example, setting up service appliance 24 for network configurations may be unnecessary. Substantially all such configurations may be made via switch 22, instead of service appliance 24. Service appliance 24 may offload (i.e., transfer) any network (e.g., L2/L3 network) specific control plane and data plane operations to switch 22. Data path acceleration that leverages an application specific integrated circuit (ASIC) (potentially embedded in switch 22) may also be possible in various embodiments. Switch 22 may communicate control messages to service appliance 24 over communication channel 26. Thus, configuration and provisioning of services within service appliance 24 may be implemented via switch 22.

Note that the numerical and letter designations assigned to the elements of FIGS. 1A and 1B do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 1B. Any number of server farms and switches may be connected in the network without departing from the broad scope of the present disclosure.

For purposes of illustrating the techniques of system 10, it is important to understand the communications in a given system such as the system shown in FIGS. 1A and 1B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as loadbalancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Typical service appliances (e.g., loadbalancers) integrate services such as loadbalancing, firewall, intrusion prevention, VPN, etc. in a single box format, which is generally based on modular, scalable platforms and which provides the most cost-effective option of the three options listed previously. Service appliances are typically connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Network services may also be provided by specially designed high-performance routers. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

However, each of these three options has certain drawbacks. For example, although option 1 (service appliances that provide the services and are physically separate from the switch or router) is the cheapest, it involves additional configuration operations that can be administratively challenging. In terms of the accompanying configuration issues, the network architecture can be typically divided into several plane, including: (i) network data plane, which performs various network data plane operations including framing, forwarding or switching, and transportation of data blocks to specific destinations; (ii) network control plane, which performs various network control plane operations including configuration, policy programming, logging, monitoring, and resource discovery; and (iii) application planes, including application control plane and application data plane that perform application functions for delivering and managing network services.

In general, the network data plane addresses the physical operations that are required to actually forward a packet to the next hop. For example, the network data plane can identify the set of data bearing transport resources; store the packet in memory while control plane information (such as the next hop address and egress interface) is determined; place the appropriate Layer 2 addressing and encapsulation on the frame, and then forward the packet out the appropriate egress interface to the next hop. The network data plane can be responsible for ACLs, connection management, network address translation (NAT), loadbalancing, forwarding, etc.

In general, the network control plane deals with determining information for destination IP addresses in the network. The operations performed by the network control plane allow for the automation of higher-level network functions such as connection establishment, reconfiguration of signaled connections, connection restorations, etc. The network control plane may control the network data plane in real-time. Some functions may be embedded with elements of the network data plane, while other functions may be allocated to standalone control plane elements. The network control plane can be used to configure management traffic, syslogs, ARP, DHCP, etc. The network control plane is responsible for device management and control, configuration management (e.g., via command line interfaces (CLIs)), address resolution protocol (ARP), Access control list (ACL) compilation, etc.

In general, applications in the service appliance may send and receive data via the application data plane, for example, by opening software interfaces such as sockets that transmit and receive data over the network on behalf of the application. The application control plane may perform resource allocation, traffic engineering and performance optimization, among other functions, which may be specific to the application's network needs. For example, the application control plane may send control signals to start and stop transmission.

Service appliances are typically configured with network control plane, network data plane, and application planes. Service appliances usually communicate data plane messages with external network elements, whereas the control messages are internal within the service appliance. Packets sent from (and to) clients are routed through the service appliance and processed by applications in the service appliance before being forwarded to their intended destinations. Because service appliances perform network specific (L2/L3) control plane and data plane operations (in addition to application specific functions), any network specific configuration changes should be propagated to the service appliance.

For instance, loadbalancers are typically located near the end of solution delivery at data center server farms and, further, are generally managed by application/server administrators. Separately, the configurations on the switches, routers, etc. can be handled by network administrators. Loadbalancers have specific networking configurations like port-channel, virtual local area networks (VLANs), static IP routes, etc., and also loadbalancer specific configurations such as server farms, virtual-IP, servers, loadbalance policies, etc. Changes in the network configuration of the loadbalancer (or changes in network topology that could affect loadbalancer configurations) would require the application administrators and network administrators to work together to configure the loadbalancer appropriately, where these activities would engender administrative overhead and costs.

Moreover, service appliances may have to be compatible with particular features on the switches. The service appliance may have to support particular routing protocols, or be compatible with network features such as locator/identifier separation protocol (LISP), fabricpath, etc. that are supported by the switch. Further, when a service appliance is connected to a switch, the service appliance has to be configured separately for each virtual local area network ((VLAN), which is a logical division of a computer network within which information can be transmitted for all devices to receive) connected to the switch. In general, VLANs enable segmenting a switched network so that devices in one VLAN do not receive information packets from devices in another VLAN. If a separate VLAN that is provisioned for other client traffic is connected to the switch, then that VLAN has to be provisioned in the service appliance. Similarly, if any of the server side VLANs change, the change should be accounted for in the service appliance.

For example, a service appliance is typically configured with separate VLANs for separate traffic flows. Typical service appliances are configured to establish a VLAN interface when the user specifies a port, port mode, and management VLAN. The service appliances are configured to run a setup script. For a network with two VLANs (VLAN1 at IP address 1.1.1.1 and VLAN 2 at IP address 2.2.2.2, client at IP address 100.100.100.100 and a router at IP address 1.1.1.2), the service appliance configuration may appear as follows:

port-channel 1
    switch port trunk vlan 1-100
    int 01/1-3
    channel-group 1
    no shut
    int vlan 1 {client side vlan)
    IP address 1.1.1.1
    no shut
    int vlan 2 {server side vlan}
    IP address 2.2.2.2
    no shut
    static IP route 100.100.100.100 1.1.1.2 1

Any change in VLAN groups (client side, or server side) may necessitate a reconfiguration of the service appliance.

Options 2 and 3 (specially designed high-performance routers configured with the services, along with network devices configured with line cards that provide the service, respectively) are relatively expensive to develop for manufacturers (and expensive to buy from the customer perspective). They are also not as fast-to-market as the standard service appliances of option 1. Moreover, a user with a specially designed high-performance router may find that an upgrade to the network may involve upgrading the entire router. In addition, although upgrades may be relatively cheaper with line cards, the line cards themselves may have a limited (or fixed) feature set, and certain desired functionalities may be lacking compared to off-the-shelf standard service appliances. With all three options, it is difficult to mix and match services at a low cost (both investment and management costs) for a network topology that continues to change according to increasing demands on performance and efficiency.

System 10 is configured to address these issues (and others) in offering a system and method for configuring service appliances as virtual line cards in a network environment. According to embodiments of the present disclosure, a communication channel 26 (e.g., port-channel) may be established between service appliance 24 and switch 22. Service appliance 24 and switch 22 may be configured to enable service appliance 24 to offload network control plane and network data plane operations to switch 22, where control messages may be communicated between service appliance 24 and switch 22 over communication channel 26. A route may also be added to include service appliance 24 as virtual line card 25 at switch 22, and the route may be propagated to other network elements in the network.

In certain non-limiting embodiments, external service appliance 24 can be standard hardware that can be vendor agnostic, while being cheap and fast-to-market. Service module 24 may be configured as an in-chassis service module to seamlessly provide network services without additional configuration issues. According to embodiments of system 10, appliance configurations need not be reconciled with network configurations. Service appliance 24 offloads network specific (L2/L3) network control plane and network data plane operations to switch 22, thereby enabling network and server administrative functions to be clearly demarcated.

Service appliance 24 need not support particular routing protocols or be compatible with network features supported by switch 22, where any network features like LISP, fabricpath, etc. can be supported by switch 22 alone. Virtual services may run on service appliance 24 (rather than switch 22), which enhances network performance. According to embodiments of the present disclosure, switch 22 may attach on the module presented by virtual line card 25 (e.g., through attach {slot|{switch num module num}} command). Using the attach command, a user may be able to open a session to virtual line module. Upon attaching virtual line card 25 appropriately to switch 22, the user can manage services provided by service appliance 24 at switch 22 and, further, can provision the services appropriately.

In an example involving virtual line card 25, configuration settings of switch 22 may appear as follows for a two VLAN network (e.g., VLAN 1 and VLAN 2 at IP addresses 1.1.1.1 and 2.2.2.2 respectively):

int port-channel 1
   switchport trunk vlan 1,2
   int gi10/1-3
   channel-group 1
   int vlan 1
   IP address 1.1.1.1 255.255.255.0
   no shut
   int vlan 2
   IP address 2.2.2.2 255.255.255.0
   no shut Turning to the potential infrastructure of FIGS. 1A and 1B, the example network environment may be configured as one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20*a*, and 20*b*, may include any type of network element connecting network segments. For example, switches 22, 20*a*, and 20*b* may include a multi-port network bridge that processes and routes data at a data link layer (Layer 2). In another example, switches 22, 20*a*, and 20*b* may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 22, 20*a*, and 20*b* may be integrated into other network devices such as gateways, routers, or servers. In various embodiments, switches 22, 20*a*, and 20*b* may be managed switches (e.g., managed using CLI, a web interface, etc.).

Communication channel 26 may include a port-channel, which can encompass an aggregation of multiple physical interfaces into one logical interface, for example, to provide higher aggregated bandwidth, loadbalancing and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel (vPC).

Although FIGS. 1A and 1B show server farms 14*a* and 14*b*, it should be appreciated that system 10 is not limited to servers. In fact, any network element may be connected to the network via appropriate switches, where these implementations may be based on particular needs. As used herein, the term "network element" is meant to encompass computers, network appliances, servers, routers, switches, gateways, bridges, loadbalancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. Various other configurations and devices are contemplated within the broad framework of the present disclosure.

According to embodiments of the present disclosure, system 10 may provide for a fabric extender (FEX)-like protocol, auto-discovery, message transport service (MTS)-like control messages, and defined messages between service appliance 24 and switch 22. Configuration of service appliance 24 may be performed on switch 22 as for a line card. Data path forwarding may be offloaded to network line cards in switch 22. Control path processing may be offloaded to a supervisor engine on switch 22 as appropriate. In embodiments where service appliance 24 has multiple virtual services (e.g., virtual machines), each virtual service may be a separate virtual line card on switch 22.

Figure 2:
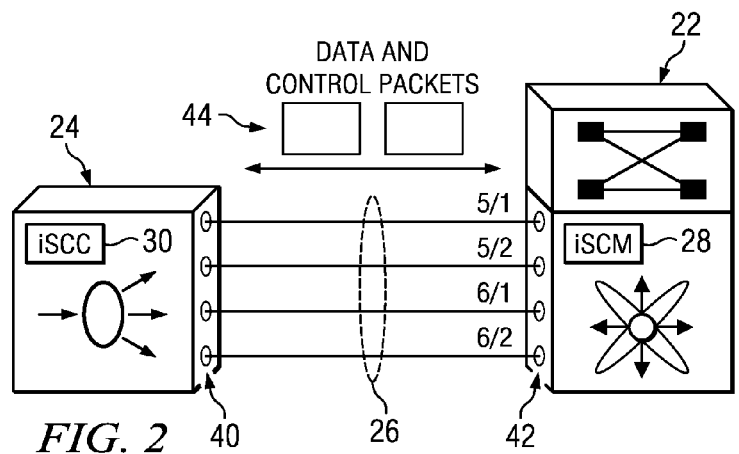
FIG. 2 is a simplified block diagram illustrating example details of the system in accordance with one embodiment.

Turning to FIG. 2, FIG. 2 is a simplified block diagram illustrating additional details of system 10 in accordance with one possible implementation. Service appliance 24 includes a plurality of appliance ports 40, and switch 22 may include a plurality of switch ports 42. Appliance ports 40 and switch ports 42 may be connected in any suitable manner to form communication channel 26. In certain instances, switch ports 42 may be line card ports of the same type (e.g., Ethernet) as appliance ports 40. RISE messages, including a plurality of data and control packets 44, may be communicated through communication channel 26 between iSCM 28 on switch 22 and iSCC 30 on service appliance 24. In example embodiments, the control messages may be in MTS payload format; the transport may be in UDP protocol; and integration may follow a box-in-box model. In one example embodiment, the user (e.g., a network administrator) may allocate switch ports 42 for connection to service appliance 24, and also configure switch ports 42 as a port-channel in trunk switch-mode associating a list of VLANs.

In example embodiments, a management IP address can be configured as a sub-interface on communication channel 26. Service appliance configuration can be done using any existing appliance configuration model on the management sub-interface. Service appliance 24 may communicate various information such as route health injection (RHI), Auto-policy-based-routing (Auto-PBR), access control lists (ACLs), application status, statistics and license information, etc. to switch 22. Switch 22 may communicate various information such as virtual device contexts (VDCs), VLANs, In-Service Software Upgrades (ISSU), and VLAN auto-states to service appliance 24 on communication channel 26.

In various embodiments, RISE (e.g., implemented as iSCC 30 in service appliance 24 and counterpart iSCM 28 in switch 22), can provide a plug-and-play approach to configure service appliance 24 as virtual line card 25. In an example embodiment, iSCM 28 may be implemented in a supervisor engine of switch 22. Note that communication channel 26 may be interchangeably referred to herein as a RISE channel, which is representative of one of the many types of channels that can be used in accordance with the teachings of the present disclosure. iSCC 30 and iSCM 28 may interact to provide communication channel 26 (i.e., RISE channel). In one embodiment, a default mode for service appliance 24 is set to RISE mode (e.g., iSCC 30 is active) and appliance ports 40 are set in operation mode. When a user configures communication channel 26, a RISE-Discovery Packet (RISE-DP) may be sent out from switch 22 using a multicast address. In response, service appliance 24 can send a response packet: performing a handshake to establish bootstrap. As a result, the appropriate switch IP (e.g., supervisor IP) and the service appliance IP are made known to both devices for subsequent control-message communications between service appliance 24 and switch 22.

In specific embodiments, auto-discovery and bootstrap may be supported in a directly attached mode. To configure service appliance 24 as virtual line card 25, appliance ports 40 may be connected to switch ports 42. Communication channel 26 may be subsequently configured appropriately (e.g., through appropriate commands on CLI such as switch (config)# interface port-channel 100, etc.). In an embodiment where vPC is used, the vPC may also be appropriately configured (e.g., by providing an appropriate vPC number). Each switch port 42 may also be configured in RISE mode. For example, according to the example embodiment shown in FIG. 2, Ethernet ports 5/1 (e.g., slot 5, port 1), 5/2, 6/1, and 6/2 can be configured in RISE mode for communication channel 26. After appropriate service instances are constructed and VLAN groups assigned, service appliance 24 can appear as virtual line card 25 in switch 22. The appliance serial number may be associated with a virtual slot number for service appliance 24. A "show module service" command may display service appliance 24 as being active on a virtual slot.

As used herein, a "service instance" occurs when a network element (e.g., switch 22, a server in server farm 14a, etc.) requests and/or engages one or more services from service appliance 24. In an example embodiment, the service instance may be constructed for communication between switch 22 and service appliance 24. Constructing the service instance may involve configuring an application session to transmit (physically or virtually) payload data between switch 22 and service appliance 24, a communication session to manage infrastructure resources and connectivity controls for payload data streams, and a transport session to control the physical movement of the payload data. In example embodiments, constructing a service instance may include specifying an interface for communication channel 26 between service appliance 24 and switch 22, setting an Internet Protocol (IP) address and netmask at service appliance 24, specifying a VLAN for control message communication between service appliance 24 and switch 22, specifying a VLAN group that service appliance 24 can use, and performing a bootstrap handshake between service appliance 24 and switch 22.

In an indirectly attached mode (e.g., either L2 or L3 adjacent), manual configuration may be used at each end to establish control channel connectivity. For example, the user may first enable RISE mode by using CLI (e.g., by using command ace(config)# [no] rise.) The user may configure communication channel 26, management VLANs and management IP on service appliance 24. Communication channel 26 may be separately configured on switch 22. Member ports (e.g., 5/1, 5/2, 6/1 and 6/2) may be appropriately added to communication channel 26, where suitable service instances may be constructed and VLAN groups may be assigned.

Figures 3, 4:
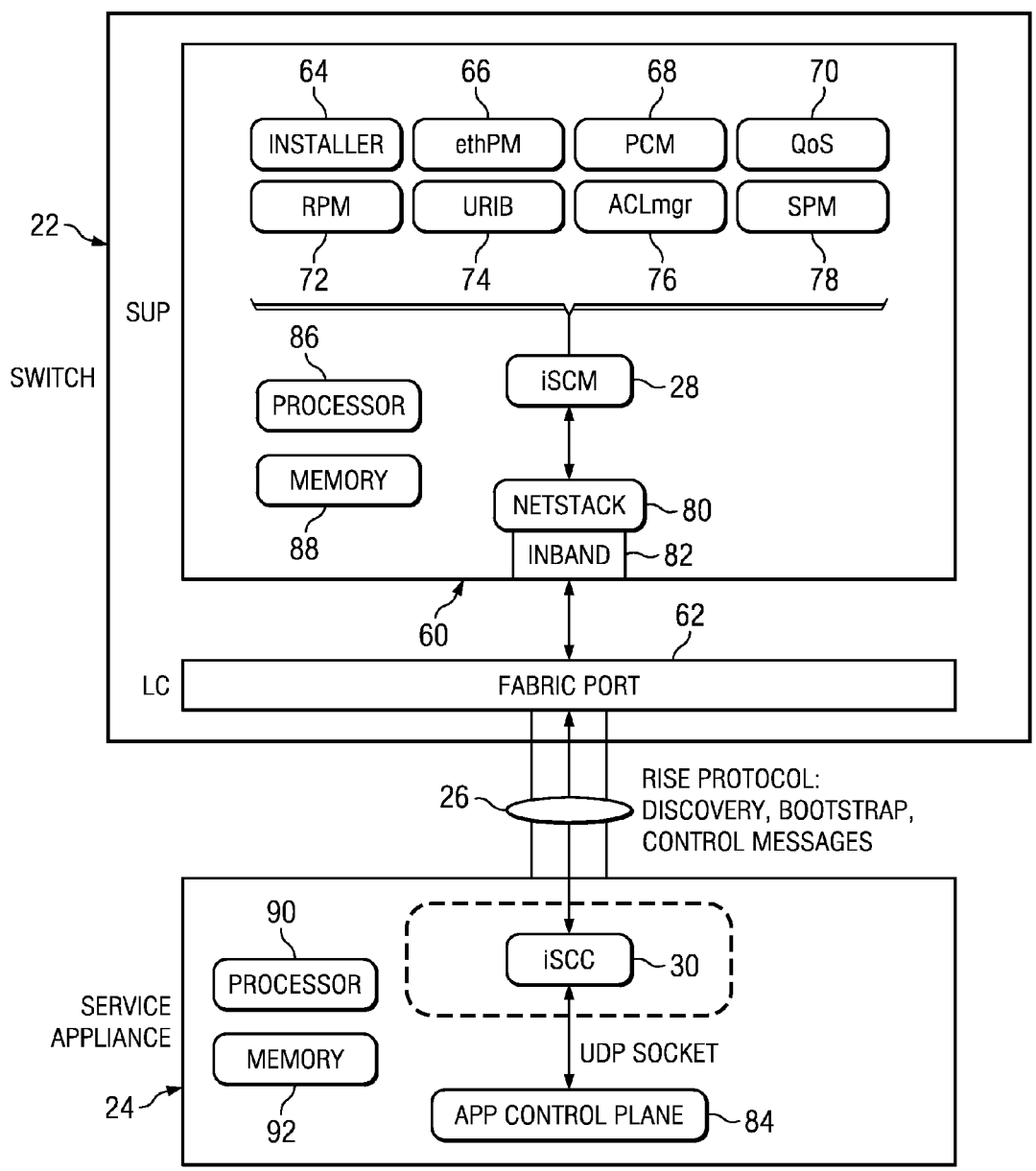
FIG. 3 is a simplified diagram illustrating an example output screen in accordance with one embodiment.
FIG. 4 is a simplified block diagram illustrating details of the system in accordance with one embodiment.

Turning to FIG. 3, FIG. 3 is an example output screen 50 showing service modules according to embodiments of the present disclosure. After service appliance 24 has been configured as virtual line card 25, a "show module service" or equivalent command may bring up a display 52 showing service appliance 24 as a RISE module type on a virtual slot. In the example shown in FIG. 3, service appliance 24 may be a Cisco® Application Control Engine (ACE) connected to switch 22, which may be a Cisco Nexus 7000 switch in certain example implementations. Various other switches, gateways, routers, etc. can be exchanged for this particular switch without departing from the broad scope of the present disclosure. Switch 22 may be preconfigured with other service modules, for example, "Agni ASA Module" of model OSIRIS on slot number four with four-port connectivity. Service appliance 24 may appear as a "RISE" module on virtual slot number 300.1 with four-port connectivity.

Turning to FIG. 4, FIG. 4 is a simplified block diagram illustrating example details of system 10 according to embodiments of the present disclosure. A supervisor engine 60 on switch 22 may communicate service appliance 24 via a line card including a fabric port 62 that connects point-to-point to a node on service appliance 24. Supervisor engine 60 may include several modules such as an installer 64, an Ethernet port manager (ethPM) 66, a port-channel manager (PCM) 68, a Quality of Service (QoS) element 70, a route policy manager (RPM) 72, a unified routing information base (URIB) 74, an access control list manager (ACLmgr) 76, and a service policy manager (SPM) 78 for performing various routing and/or management functions. iSCM 28 may be provisioned in supervisor engine 60 to provide RISE related functionalities. iSCM 28 may manage one or more service modules, including in-chassis service modules and remote service modules.

In various embodiments, service appliance 24 may support stream control transmission protocol (SCTP) with various addresses (e.g., 127 addresses). In the absence of native SCTP support in supervisor engine 60, tunneling over UDP may be enforced to send SCTP packets. A Netstack module 80 may be provisioned in supervisor engine 60 for implementing TCP/IP stack for received frames hitting the control-plane of supervisor engine 60. Supervisor engine 60 may be configured with an inband port 82, which may be a virtual port that provides an interface for management traffic (such as auto-discovery) to a management processor such as a processor 86.

According to various embodiments, iSCM 28 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. iSCM 28 may be a finite state machine utility (FSMU) based application (e.g., which indicates an abstract machine that can be in one of a finite number of states). In various embodiments, iSCM 28 may have a well-defined MTS seamless authentication protocol (MTS SAP) assigned and it can open a socket-based MTS queue and bind to the well-defined SAP such that other processes may communicate with it.

In various embodiments, iSCM 28 may also maintain an array of MTS operation code ("opcode"), which can define how to process a received MTS message. The array may include per-opcode specific MTS flags, handler functions, etc. iSCM 28 may be configured to receive CLI driven MTS messages, MTS notifications (such as event driven messages indicating, for example, that a particular VLAN is up or down), and MTS request/responses. In various embodiments, iSCM 28 may be configured so that MTS-based communication with other processes may be non-blocking and asynchronous. Thus, iSCM 28 may handle multiple events (which can arrive at any time) for the same resource such that the state of the resource is consistent (and not compromised).

Subsequent to ports (e.g., appliance ports 40 and switch ports 42) being configured in RISE mode, auto-discovery and bootstrap may be performed by iSCM 28 and iSCC 30 to establish an appropriate control channel. After the control channel is established, applications in service appliance 24 may send control messages (e.g., using the UDP socket interface) to iSCC 30 through an application control plane 84. Application control plane 84 generally encompasses one or more software components for performing workflow management, self-management, and other application control layer processes. iSCC 30 may forward the control messages to iSCM 28 of switch 22 over communication channel 26. In example embodiments, iSCM 28 and iSCC 30 may communicate via UDP packets; however, various other protocols and formats may be accommodated by the teachings of the present disclosure. Supervisor 60 may be provisioned with (or have access to) processor 86 and a memory 88 for performing its various functions. iSCM 28 may use processor 86 and memory 88 to perform RISE related functions in switch 22. Similarly, service appliance 24 may be provisioned with (or have access to) a processor 90 and a memory 92. iSCC 30 may use processor 90 and memory 92 to perform RISE related functions in service appliance 24.

Figure 5:
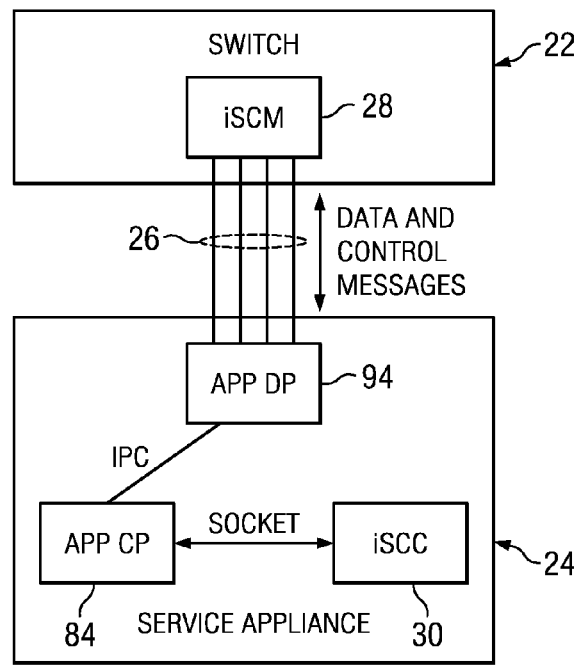
FIG. 5 is a simplified block diagram illustrating other details of the system in accordance with one embodiment.

Turning to FIG. 5, FIG. 5 is a simplified block diagram of additional potential details of system 10. Service appliance 24 may be configured with an application data plane (App DP) 94 and application control plane (App CP) 84. App DP 94 generally encompasses one or more software components for performing application data layer processes such as sending and receiving application data. App DP 94 and App CP 84 include functions related to delivering and managing application services provided by service appliance 24. In various embodiments, inter-process communication (IPC) may be used to download forwarding information from App CP 84 to App DP 94. Appropriate sockets (e.g., UDP socket) may facilitate communication between App CP 84 and iSCC 30.

According to embodiments of the present disclosure, App DP 94 can forward RISE discovery packets to iSCC 30. Appropriate application programming interfaces (API) for iSCC 30 may instruct service appliance 24 to form communication channel 26, create a RISE VLAN, and assign a RISE IP address. By default, RISE mode may be enabled in various embodiments. In some embodiments, RISE mode may be manually configured in service appliance 24. After discovery and handshake, supervisor IP address and appliance IP address may be made known to service appliance 24 and switch 22 for further control-message communication. Data and control messages may then be sent between iSCC 30 and iSCM 28 via communication channel 26.

Figure 6:
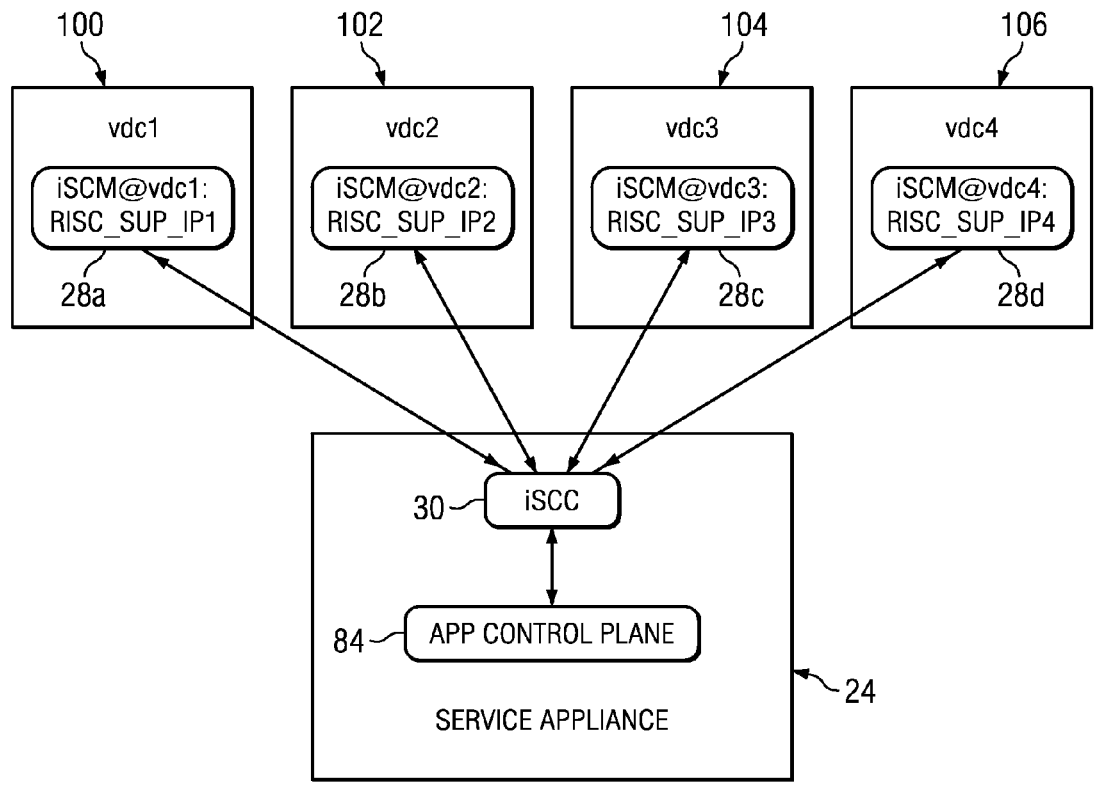
FIG. 6 is a simplified block diagram illustrating yet other details of the system in accordance with one embodiment.

Turning to FIG. 6, FIG. 6 is a simplified block diagram showing additional details of system 10. According to one embodiment, switch 22 may be configured as one or more VDCs. VDCs allow switch 22 to be virtualized at the device level, including as multiple virtualized (logical) devices. Each configured VDC presents itself as a unique device to connected users within the framework of switch 22. The VDC runs as a separate logical entity within switch 22: maintaining its own unique set of running software processes. Each VDC can have assigned to it physical ports, a separate management domain (e.g., supervisor engine), etc. Each VDC on switch 22 may be configured with a separate iSCM.

Service appliance 24 may establish RISE communication channels to multiple VDCs 100, 102, 104, and 106. Only four VDCs are illustrated in FIG. 6; however, any number of VDCs may communicate with service appliance 24 without departing from the broad scope of the present disclosure. Each of VDCs 100-104 may be virtual contexts within a single physical switch (e.g., switch 22). VDC1 100 may be provisioned with iSCM 28*a*; VDC2 102 may be provisioned with iSCM 28*b*; VDC3 104 may be provisioned with iSCM 28*c*; and VDC4 104 may be provisioned with iSCM 28*d*. iSCC 30, provisioned in service appliance 24 and in communication with application control plane 84, may oversee all VDCs 100-104. Each iSCM 28*a-d* may pass respective VDC identifications (e.g., VDC_num such as VDC1, VDC2, etc.) so that iSCC 30 knows where to send the return messages. iSCC 30 may use a UDP socket address in the form of RISC_SUP_IP to communicate with each VDC. In another embodiment, iSCC 30 may use a UDP socket address in the form of SUP_IP@port: 7000+VDC_num to communicate with each VDC. Various other formats for a UDP socket address may be used without departing from the scope of the present disclosure.

Figure 7:
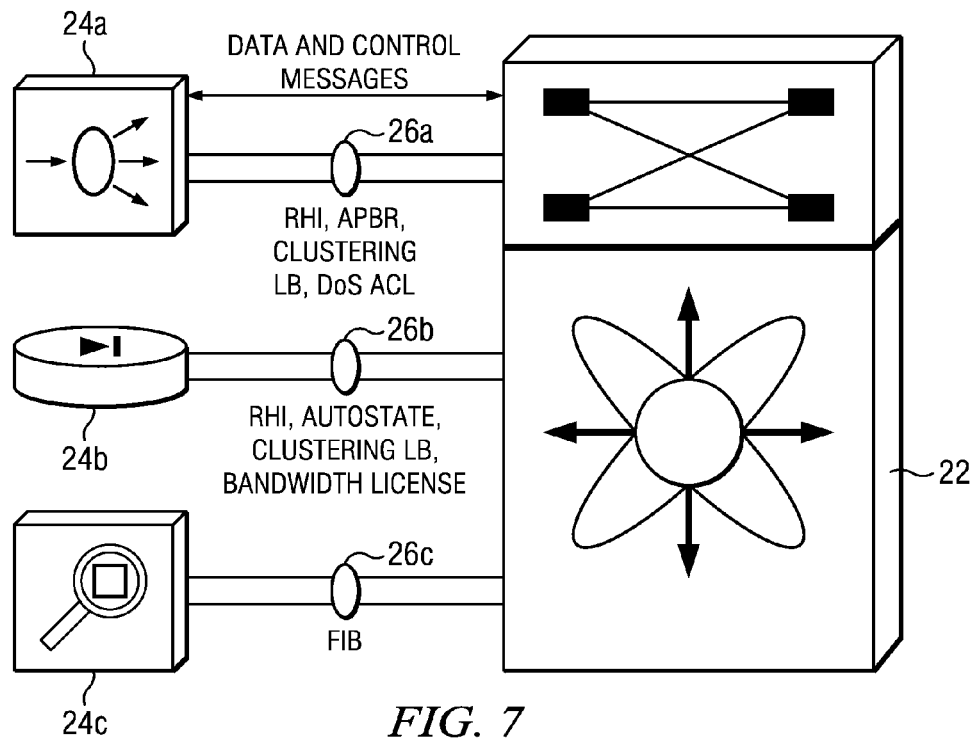
FIG. 7 is a simplified block diagram illustrating another example embodiment of the system.

Turning to FIG. 7, FIG. 7 is a simplified block diagram illustrating another embodiment of system 10. Multiple service appliances 24*a*, 24*b*, and 24*c* may be connected to switch 22 over respective communication channels 26*a*, 26*b*, and 26*c* according to the embodiment illustrated in FIG. 7. For example, service appliance 24*a* may be a Cisco Application Control Engine (ACE), providing RHI, APBR, clustering loadbalancing (LB), DoS ACL, etc. Service appliance 24*b* may be a Cisco Adaptive Security Appliance that provides RHI, auto-state, clustering LB, bandwidth license, etc. Service appliance 24*c* may be a Cisco NetFlow analyzer, providing a forward information base (FIB) and other services. Data and control messages may be communicated between switch 22 and service appliances 24*a*, 24*b*, and 24*c* over communication channels 26*a*, 26*b*, and 26*c*, respectively.

Other types and numbers (i.e., larger or smaller number) of service appliances may be connected to switch 22 without departing from the broad scope of the present disclosure. Each service appliance 24*a-c* can be configured with respective iSCCs as appropriate. In one embodiment, each iSCC may communicate with a single iSCM on switch 22. In another embodiment, each iSCC may communicate with a separate iSCM on separate VDCs in switch 22. Other appropriate combinations of iSCCs and iSCMs may be accommodated by the broad scope of the present disclosure.

Figure 8:
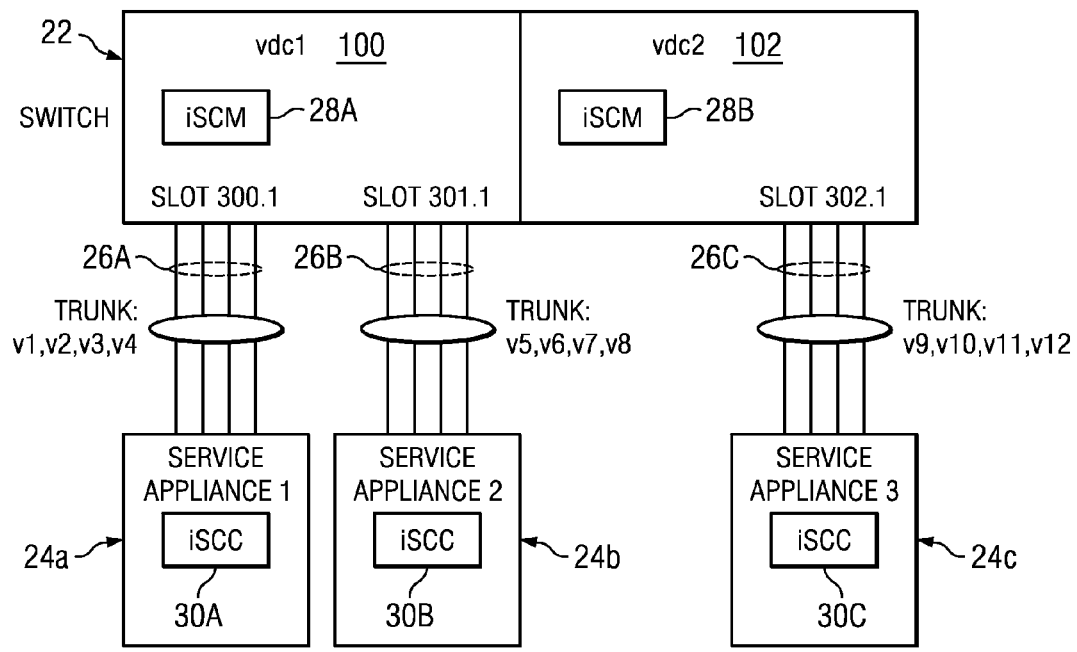
FIG. 8 is a simplified block diagram illustrating yet another example embodiment of the system.

Turning to FIG. 8, FIG. 8 is a simplified block diagram illustrating additional details of system 10. Service appliances 24*a*, 24*b*, and 24*c* may be connected to switch 22. Switch 22 may comprise two VDCs, 100 and 102, provisioned with iSCM 28*a* and iSCM 28*b*, respectively. iSCM 28*a* may communicate with (and/or manage), iSCC 30*a* of service appliance 24*a*, and iSCC 30*b* of service appliance 24*b*. iSCM 28*b* may communicate with (and/or manage), iSCC 30*c* of service appliance 24*c*. Various other configurations of service appliances and VDCs are possible within the broad framework of the present disclosure. For example, each iSCM may communicate with separate VDCs. In another example, all three iSCCs may communicate with a single VDC.

In one embodiment, iSCCs 30*a-c* and iSCM 28*a-b* may communicate using a VLAN Trunking Protocol (VTP) over communication channels 26*a-c*, respectively. In other embodiments, comparable protocols such as IEEE Generic VLAN Registration Protocol (GVRP), or IEEE Multiple VLAN Registration Protocol (MVRP) may be used over communication channels 26*a-c* for communication. The user may allocate switch ports of switch 22 for the respective service appliances 24*a-c* and configure them, for example, as port-channels in trunk switch mode (associating a list of VLANs). The trunk allowed VLANs on each communication channel 26*a-c* may include the VLANs in the VLAN group, as well as RISE-VLAN (e.g., a service appliance configured as RISE to appear as virtual line cards).

The trunk ports may be, by default, members of the VLANs that exist on switch 22, and can carry traffic for those VLANs between switch 22 and service appliances 24*a-c*. To distinguish between the traffic flows from various service appliances, the trunk ports may mark the frames with special tags as they pass between switch 22 and respective service appliances 24*a-c*. The trunk ports may be configured to specify the VLAN groups associated with the respective trunk ports. For example, communication channel 26*a* may be configured to associate VLANs v1, v2, v3, and v4; communication channel 26*b* may be configured to associate VLANs v5, v6, v7, and v8; and communication channel 26*c* may be configured to associate VLANs v9, v10, v11, and v12.

Figure 9:
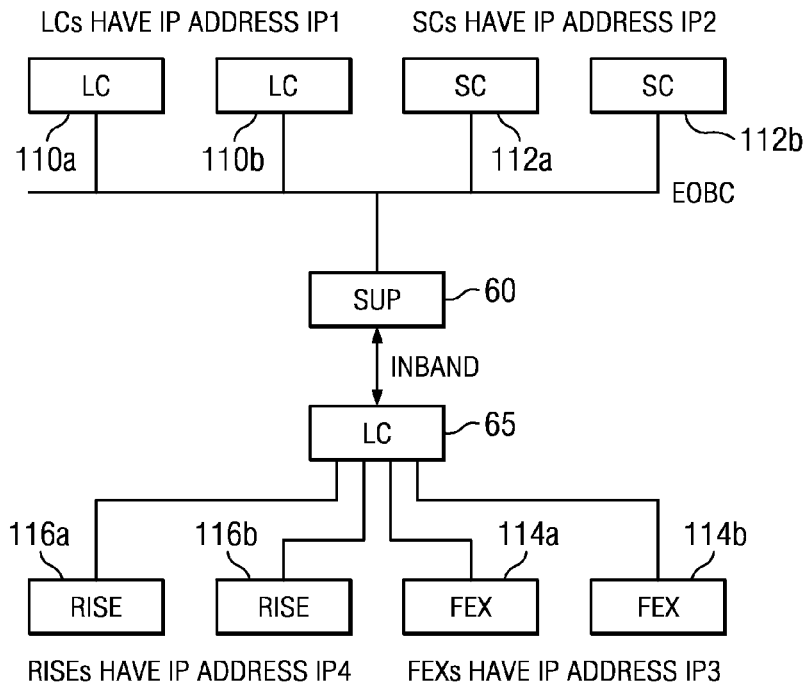
FIG. 9 is a simplified block diagram illustrating details of the system in accordance with one embodiment.

Turning to FIG. 9, FIG. 9 is a simplified block diagram illustrating details associated with example embodiments of the present disclosure. Supervisor engine 60 on switch 22 views physical modules (e.g., line cards (LCs) and service cards (SCs)) and virtual modules (e.g., Fabric Extenders (FEXs) and RISE) on various slots that have unique IP addresses assigned thereto. For example, LCs 110*a* and 110*b* are viewed on slots that may have IP address IP1; SCs 112*a* and 112*b* are viewed on slots that may have another IP address IP2; and FEXs 114*a* and 114*b* are viewed on slots that may have yet another IP address IP3. In an example embodiment, RISEs 116*a* and 116*b* may be viewed on slots that may have yet another IP address IP4. Also, note that both FEX and RISE virtual modules communicate with supervisor engine 60 via an LC 65, which means that (in this particular example) physically they are external devices to switch 22, but virtually, they can be treated as in-chassis modules.

Figure 10:
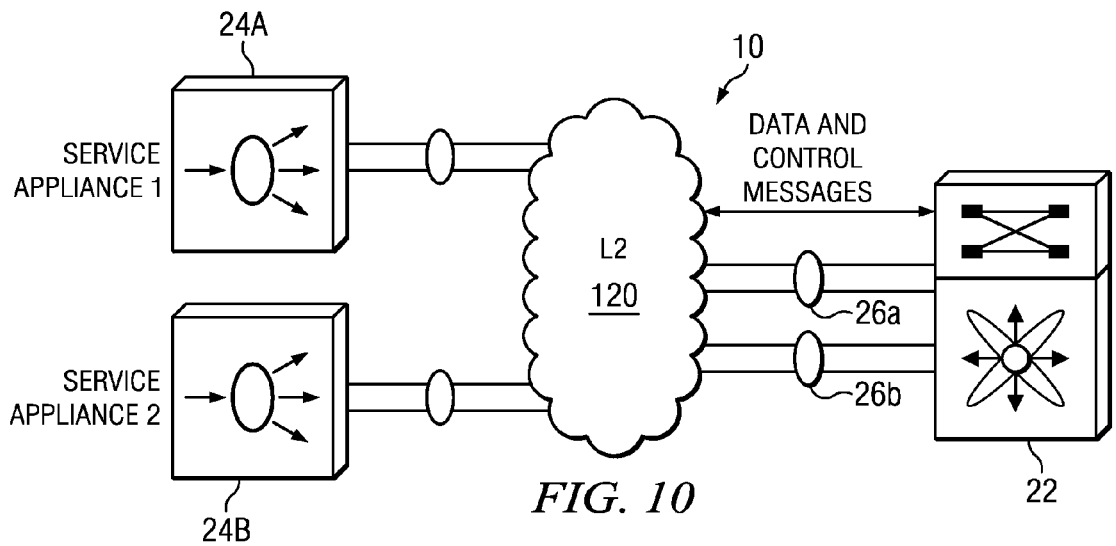
FIG. 10 is a simplified block diagram illustrating yet another example embodiment of the system.

Turning to FIG. 10, FIG. 10 is a simplified block diagram showing an example network configuration of system 10 according to embodiments of the present disclosure. According to some embodiments, service appliances 24*a* and 24*b* may be connected indirectly to switch 22 via an L2 network 120 (e.g., L2 adjacent). In such configurations, RISE connectivity and bootstrap may be manually set up and switch 22 may be configured to support indirect attachment. Data and control messages may be communicated between service appliances 24*a*, 24*b*, and switch 22 via communication channels 26*a* and 26*b* respectively and over L2 network 120. Additional service appliances may be connected indirectly via L2 network 120, or directly, to switch 22. Various combinations of direct and indirect connections are contemplated within the broad teachings of the present disclosure.

Figure 11:
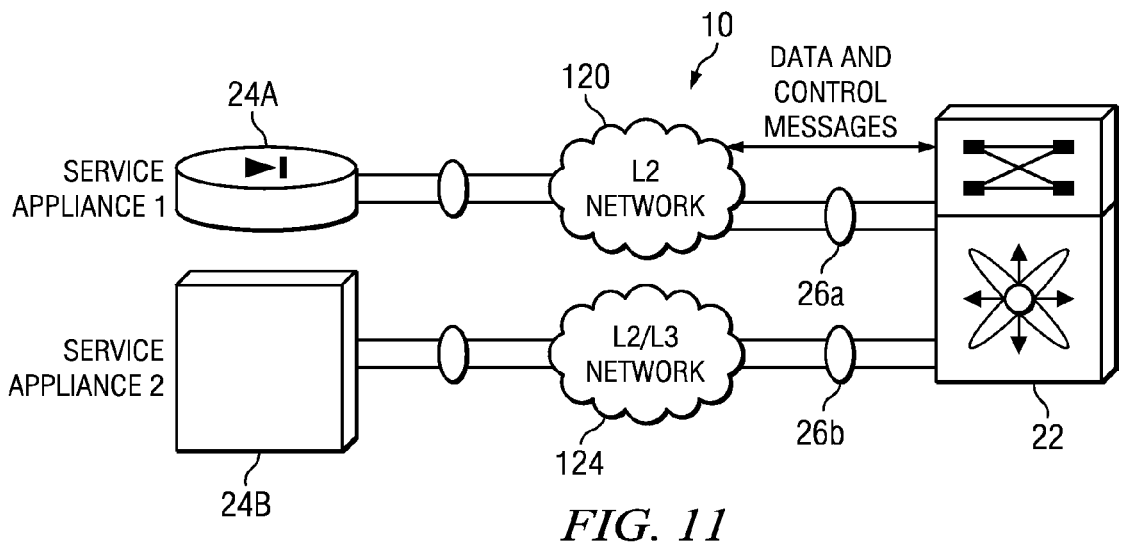
FIG. 11 a simplified block diagram illustrating yet another example embodiment of the system.

Turning to FIG. 11, FIG. 11 is a simplified block diagram showing an example network configuration of system 10 according to embodiments of the present disclosure. According to some embodiments, service appliance 24*a* may be connected indirectly to switch 22 via L2 network 120. Service appliance 24*b* may be connected indirectly to switch 22 via an L2/L3 network 124. In such configurations, switch 22 may support indirect attachment, including L2/L3 adjacency. Data and control messages may be communicated between service appliances 24*a*, 24*b*, and switch 22 via communication channels 26*a* and 26*b* and over L2 network 120 and L2/L3 network 124, respectively. Additional service appliances may be connected indirectly via L2 network 120, or L2/L3 network 124, or directly, to switch 22. Various combinations of direct and indirect connections are contemplated as being within the scope of the present disclosure.

Figure 12:
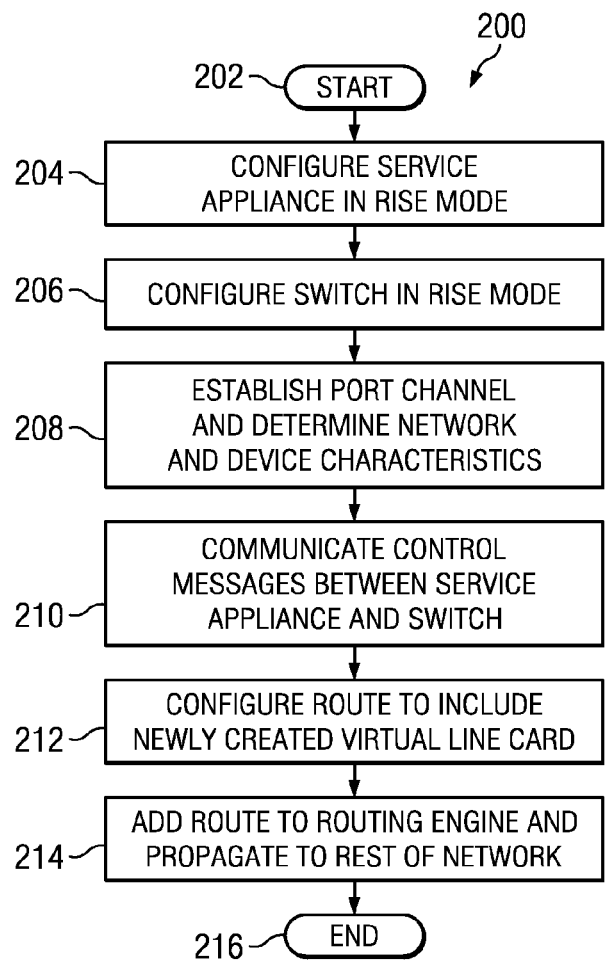
FIG. 12 is a simplified flowchart illustrating example operational steps that may be associated with an embodiment of the system.

Turning to FIG. 12, FIG. 12 is a simplified flow diagram 200 illustrating example operational steps that may be associated with embodiments of the present disclosure. The operations may start at 202, when service appliance 24 is connected to ports on switch 22. At 204, service appliance 24 may be configured in RISE mode. Configuring service appliance 24 in RISE mode can enable service appliance 24 to offload network control plane and network data plane operations to switch 22. In one embodiment, a brand new service appliance box may be factory configured to be in RISE mode by default, thereby requiring no manual or additional configurations. The box may be powered up, and ports connected directly to switch 22 line card ports of the same type (e.g., M1, F1, F2, etc.). In another embodiment, configuration of service appliance 24 may be performed manually, for example, using a CLI and appropriate commands.

At 206, switch 22 may be configured in RISE mode. Configuring switch 22 in RISE mode can enable switch 22 to accept network control plane and network data plane operations from service appliance 24 such that service appliance 24 can successfully offload these operations to switch 22. In one embodiment, switch 22 may be configured appropriately by configuring communication channel 26 and trunk allowed VLANs, Ethernet port interfaces in RISE mode, etc. In another embodiment, switch 22 may be configured appropriately by configuring communication channel 26 and adding member ports into communication channel 26 at switch 22. In some embodiments, the configuration process of switch 22 may depend on whether service appliance 24 is directly connected to switch 22, or indirectly connected (e.g., through L2 network 120).

At 208, communication channel 26 may be established between switch 22 and service appliance 24, and network characteristics of communication channel 26 may be determined. Network characteristics may include IP addresses of switch 22 and service appliance 24, device characteristics (e.g., device serial identification number, etc.) of service appliance 24, etc. Subsequently, virtual line card 25 may be visible to supervisor engine 60 on switch 22 and can be configured remotely by a network administrator of switch 22. At 210, control messages may be communicated between switch 22 and service appliance 24. Control messages may enable service appliance 24 to be configured appropriately at the switch for providing services. At 212, switch 22 may configure a route to include newly created virtual line card 25. At 214, switch 22 may add the route to a routing engine (e.g., supervisor engine 60) on switch 22, and propagate this data to the rest of the network. The process ends at 216 for this particular flow.

Figure 13:
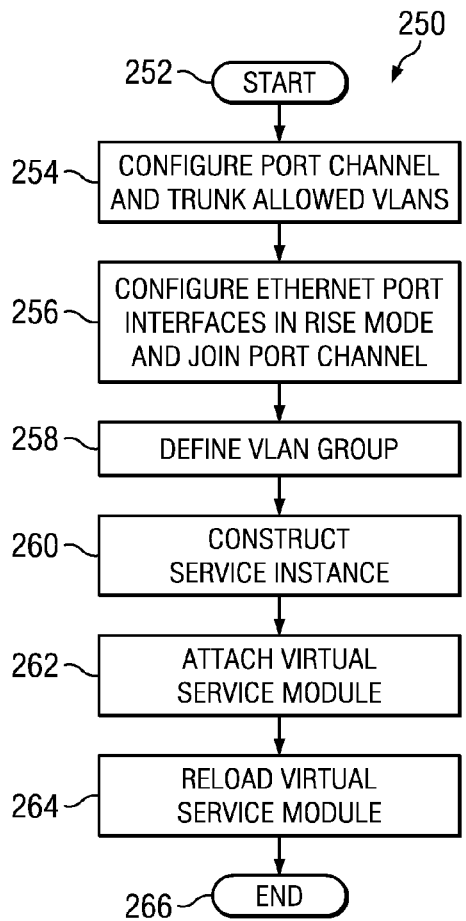
FIG. 13 is a simplified flowchart illustrating details of operational steps that may be associated with an embodiment of the system.

Turning to FIG. 13, FIG. 13 is a simplified flow diagram 250 illustrating example details of operational steps that may be associated with embodiments of the present disclosure. The operations may be implemented to configure switch 22 appropriately for RISE mode. The operations may start at 252 when service appliance 24 is connected to switch 22. At 254, communication channel 26 and trunk allowed VLANs may be configured. Communication channel 26 may be created by bundling compatible interfaces. Any configuration changes that are applied to communication channel 26 are automatically applied to each member interface of communication channel 26. Communication channel 26 may be created directly by creating a port-channel interface, or a channel group may be created that acts to aggregate individual ports into a bundle. For example, the following command on a Cisco Nexus 7000 switch provisioned with iSCM 28 may be used for creating channel-group 100 comprising communication channel 26: switch(config)# interface port-channel 100.

Trunk links may be configured to allow trunking on each end of a communication link. Ports 42 on switch 22 may be configured to enable trunking. VLANs are generally local to each switch's database, and VLAN information is not typically passed between switches. Trunk links can enable VLAN identification for frames traveling between switches. Appropriately configured trunk links typically carry traffic from all VLANs to and from switch 22 by default, but can be configured to carry only specified VLAN traffic (e.g., VLAN traffic belonging to a particular VLAN group). In one embodiment, configuration commands may be implemented through a CLI. For example, the following commands on a Cisco Nexus 7000 switch provisioned with iSCM 28 may be used for the configuration of a trunk port that enables trunking with VLANs 20, 30 and 40:

switch(config-if)# switchport trunk allowed vlan 20, 30, 40
switch(config-if)# no shut.

At 256, Ethernet port interfaces may be configured in RISE mode, and communication channel 26 may be joined. In one embodiment, Ethernet port interfaces may be added to communication channel 26 using suitable commands on a CLI. For example, the following commands may be used to configure Ethernet interfaces 5/1-2 (e.g., ports 1 and 2 on slot 5) and Ethernet interfaces 6/1-2 (e.g., ports 1 and 2 on slot 6) in channel-group 100:

switch(config)# interface ethernet 5/1-2
switch(config-if-range)# channel-group 100
switch(config-if-range)# interface ethernet 6/1-2
switch(config-if-range)# channel-group 100

At 258, appropriate VLAN groups may be defined. For example, a group name may be set, and appropriate VLAN groups associated with the group name. In one embodiment, the group name may start with a letter in the current VDC to be associated with a list of VLANs. At 260, an appropriate service instance may be constructed for communication between switch 22 and service appliance 24. At 262, service appliance 24 may be attached as virtual line card 25 (also referred to herein as virtual service module). In one embodiment, the attaching may be effected by appropriate commands. At 264, a network administrator can reload service appliance 24 from supervisor engine 60 using appropriate CLI commands (e.g., switch(config)# reload rise slot-num..sub-slot-num). Reloading can power-cycle virtual line card 25, for example, resetting configuration settings, if needed.

Figure 14:
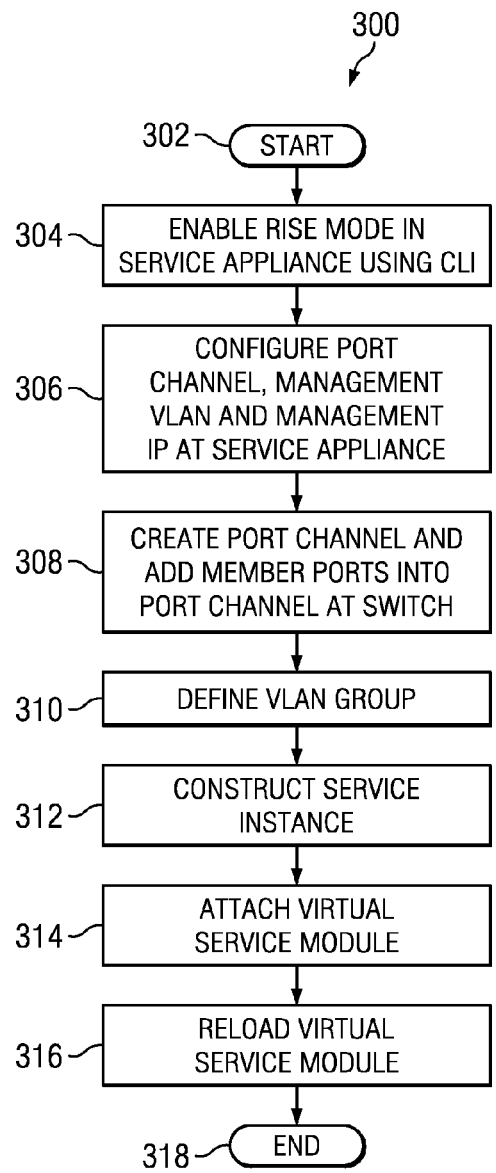
FIG. 14 is a simplified flowchart illustrating other details of operational steps that may be associated with an embodiment of the system.

Turning to FIG. 14, FIG. 14 is a simplified flow diagram 300 illustrating example details of operational steps that may be associated with embodiments of the present disclosure. The operations may begin at 302, when service appliance 24 is indirectly connected to switch 22, for example, via L2 network 120. At 304, RISE mode is enabled in service appliance 24 with appropriate commands (e.g., ace(config)# [no] rise) on a CLI. At 306, the user can configure communication channel 26, management VLAN, and management IP at service appliance 24. In an example embodiment, where an ACE service appliance is connected to a Nexus 7000 switch, appropriate interfaces may be set in the switch as follows:

ace(config)# interface gigabitEthernet 1/1
ace(config)# channel-group 1
ace(config)# no shutdown.

VLANS associated with communication channel 26 may be properly set. In addition, appropriate IP addresses can be configured for VLAN management, for example, using the following possible commands (reflective of an embodiment in which an ACE service appliance is connected to a Nexus 7000 switch):

ace(config)# interface vlan 10
ace(config)# description Management Vlan
ace(config)# IP address 10.10.10.10 255.255.255.0

At 308, switch 22 may be appropriately configured, for example, by creating communication channel 26 and adding member ports into communication channel 26. At 310, a VLAN group usable by communication channel 26 may be set (e.g., switch(config)# vlan group ace-group1 vlan-list 20, 30, 40, etc.). At 312, a service instance may be constructed to facilitate communication between switch 22 and service appliance 24 over communication channel 26. In example embodiments, constructing the service instance may include specifying an interface for the communication channel between service appliance 24 and switch 22 (e.g., communication channel 26), setting an Internet Protocol (IP) address and netmask at service appliance 24, specifying a VLAN for control message communication between service appliance 24 and switch 22, specifying a VLAN group that service appliance 24 can use, and performing a bootstrap handshake between service appliance 24 and switch 22.

In an example embodiment with an ACE service appliance connected to a Nexus 7000 switch, the following commands (among others) may be used to construct the service instance:

switch(config)# service type rise name ace1
switch(config-rise)# mode indirect
switch(config-rise)# port po100
switch(config-rise)# rise-vlan 10
switch(config-rise)# rise-IP 10.10.10.10 255.255.255.0
switch(config-rise)# vlan group ace-group1.

At 314, virtual service module (i.e., virtual line card 25) may be attached using appropriate commands (e.g., switch(config)# attach rise slot-num.sub-slot-num). At 316, virtual line card 25 may be reloaded if needed. The process ends at 318.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 24 and/or switch 22 (e.g., through various modules, algorithms, processes, etc.). In some embodiments, one or more of these features may be implemented in hardware, provided external to these elements, or consolidated in any appropriate manner to achieve the intended functionality. Service appliance 24 and/or switch 22 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 22 and service appliance 24 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 92, memory 88) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 86 and processor 90 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 88, memory 92) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 may be applicable to other exchanges, formats, or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   establishing a communication channel between a service appliance and a switch; and
   configuring the service appliance to offload network control plane and network data plane operations to the switch, wherein the configured service appliance acts as a virtual line card in the switch, wherein the configuring comprises
      communicating control messages between the service appliance and the switch over the communication channel and configuring a service instance to transmit data messages between the service appliance and the switch over the communication channel, wherein services provided by the service appliance are managed and provisioned at the switch, wherein the services run on the service appliance appearing as the virtual line card in the switch.

2. The method of claim 1, further comprising:
   communicating data messages between the service appliance and the switch over the communication channel.

3. The method of claim 1, further comprising:
   configuring the communication channel at the switch;
   configuring virtual local area networks (VLANs) over the communication channel; and
   attaching the service appliance as the virtual line card in the switch.

4. The method of claim 1, wherein configuring the service instance comprises:
   specifying an interface for the communication channel;
   setting an Internet Protocol (IP) address and netmask at the service appliance;
   specifying a VLAN for the control message communication;
   specifying a VLAN group for the service appliance; and
   performing a bootstrap handshake between the service appliance and the switch.

5. The method of claim 1, wherein the switch includes an intelligent service card manager module (iSCM) that forms part of a Remote Integrated Service Engine (RISE) element with a corresponding intelligent service card client module (iSCC) on the service appliance.

6. The method of claim 5, wherein the iSCM performs a selected one of a group of functions, the group consisting of:
   a) a RISE message management function;
   b) a service discovery/bootstrap function;
   c) a service policy handling function;
   d) a restarting function;
   e) an event handling function;
   f) a timer event function;
   g) a packet switch stream (PSS) function;
   h) a Standard Code for Information Interchange (ASCII) generation function;
   i) a logging function; and
   j) a debugging function.

7. The method of claim 5, wherein the iSCC communicates with an application control plane in the service appliance over a user datagram protocol (UDP) socket.

8. The method of claim 1, further comprising:
   configuring a new route at the switch for a newly created virtual line card, wherein the route is provided to a routing engine process and propagated to other switches in a network.

9. Logic encoded in non-transitory storage media that includes instructions for execution and when executed by a processor operable to perform operations comprising:
   establishing a communication channel between a service appliance and a switch; and
   configuring the service appliance to offload network control plane and network data plane operations to the switch, wherein the configured service appliance acts as a virtual line card in the switch, wherein the configuring comprises
   communicating control messages between the service appliance and the switch over the communication channel and configuring a service instance to transmit data messages between the service appliance and the switch over the communication channel, wherein services provided by the service appliance are managed and provisioned at the switch, wherein the services run on the service appliance appearing as the virtual line card in the switch.

10. The logic of claim 9, the operations further comprising:
    communicating data messages between the service appliance and the switch over the communication channel.

11. The logic of claim 9, the operations further comprising:
    configuring the communication channel at the switch;
    configuring virtual local area networks (VLANs) over the communication channel; and
    attaching the service appliance as the virtual line card in the switch.

12. The logic of claim 9, the operations further comprising:
    specifying an interface for the communication channel;
    setting an Internet Protocol (IP) address and netmask at the service appliance;
    specifying a VLAN for the control message communication;
    specifying a VLAN group for the service appliance; and
    performing a bootstrap handshake between the service appliance and the switch.

13. The logic of claim 9, wherein the switch includes an intelligent service card manager module (iSCM) that forms part of a Remote Integrated Service Engine (RISE) element with a corresponding intelligent service card client module (iSCC) on the service appliance.

14. The logic of claim 13, wherein the iSCC communicates with an application control plane in the service appliance over a user datagram protocol (UDP) socket.

15. The logic of claim 9, the operations further comprising:

configuring a new route at the switch for a newly created virtual line card, wherein the route is provided to a routing engine process and propagated to other switches in a network.

16. An apparatus, comprising:

a memory for storing data; and a processor operable to execute instructions associated with the data, wherein the processor and the memory cooperate such that the apparatus is configured for:

establishing a communication channel with a service appliance such that the service appliance is configured to offload network control plane and network data plane operations to the apparatus, wherein the configured service appliance acts as a virtual line card in the apparatus, wherein the configuring comprises communicating control messages between the apparatus and the service appliance over the communication channel and configuring a service instance to transmit data messages with the service appliance over the communication channel, wherein services provided by the service appliance are managed and provisioned at the apparatus, wherein the services run on the service appliance appearing as the virtual line card in the apparatus.

17. The apparatus of claim 16, wherein the apparatus is further configured for:

communicating data messages between the apparatus and the service appliance over the communication channel.

18. The apparatus of claim 16, wherein the apparatus is further configured for:

configuring the communication channel at the switch;

configuring virtual local area networks (VLANs) over the communication channel; and attaching the apparatus as the virtual line card in the switch.

19. The apparatus of claim 16, wherein the apparatus is further configured for:

specifying an interface for the communication channel;

setting an Internet Protocol (IP) address and netmask at the apparatus;

specifying a VLAN for the control message communication;

specifying a VLAN group for the apparatus; and performing a bootstrap handshake between the apparatus and the switch.

20. The apparatus of claim 16, wherein the apparatus is further configured for:

configuring a new route for a newly created virtual line card, wherein the route is provided to a routing engine process and propagated to switches in a network.

* * * * *